April 22, 1930. C. G. HAWLEY 1,755,780
LINE FILTER
Filed March 8, 1926 3 Sheets-Sheet 1

Inventor
Charles G. Hawley
By [signature] Attorney

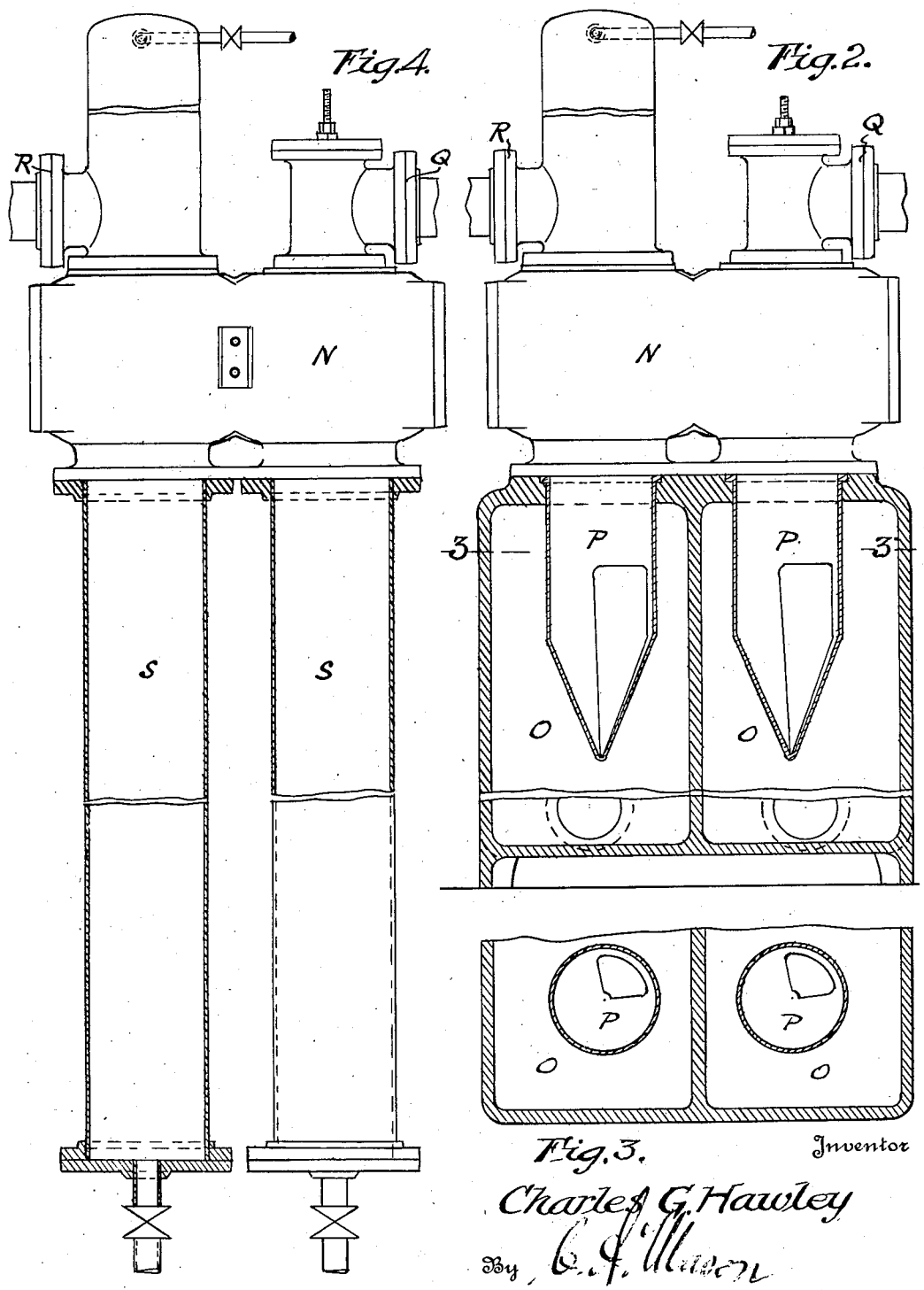

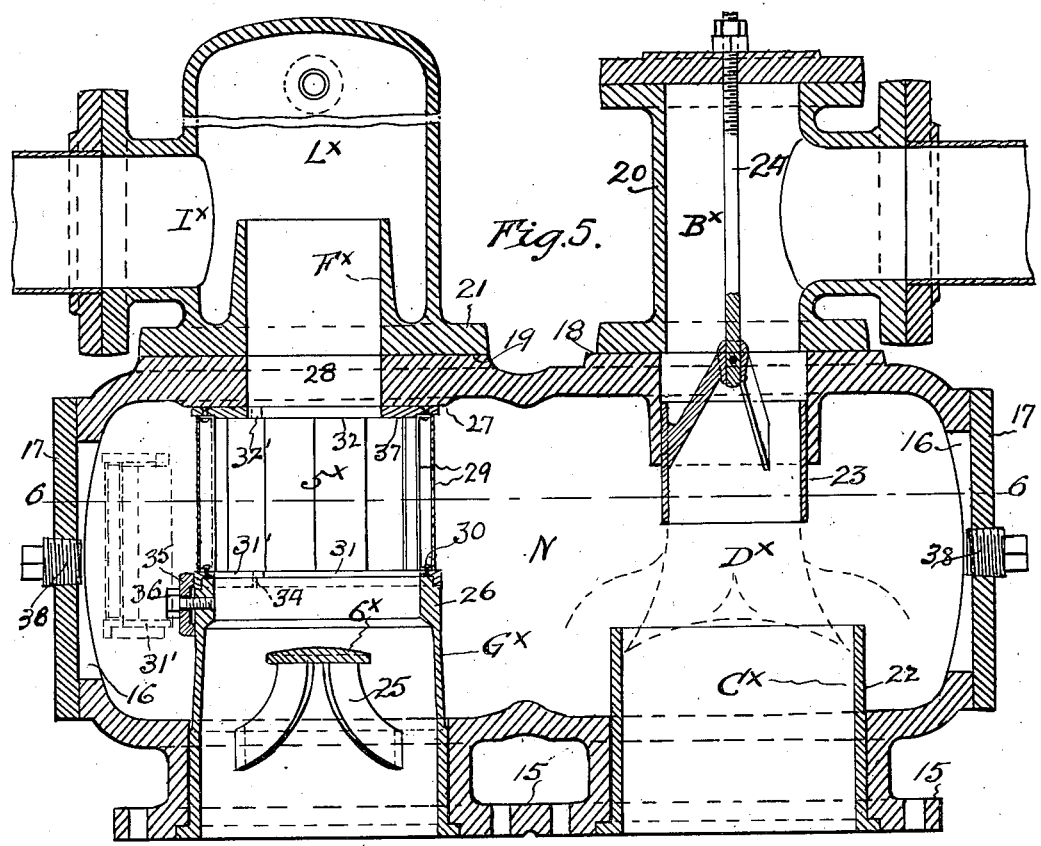
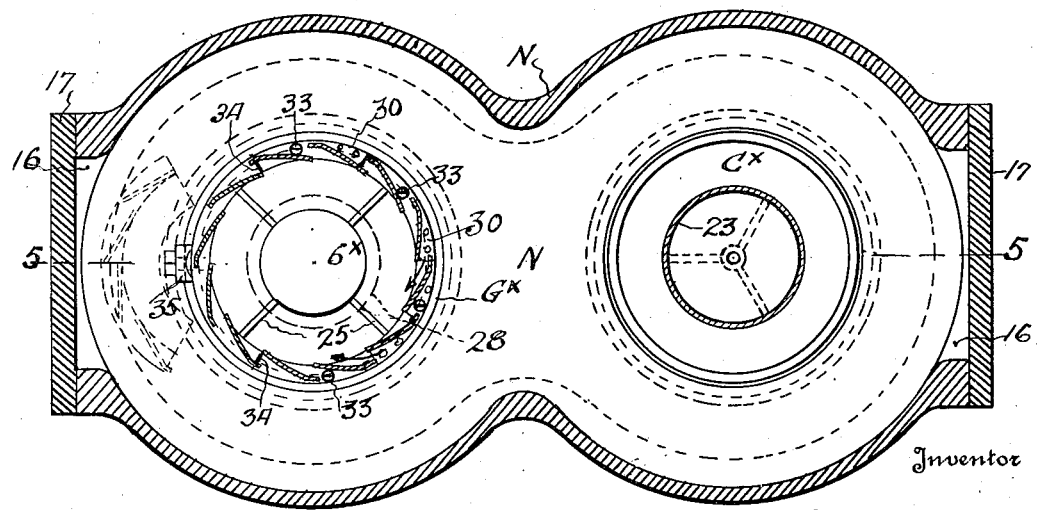

Patented Apr. 22, 1930

1,755,780

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

LINE FILTER

Application filed March 8, 1926. Serial No. 93,275.

This invention has to do with the filtration; that is, the purification, of water and other liquids in the state of flow and without resort to screens.

The primary object of the invention is to provide a filter or separator which shall be adapted for direct inclusion in pipe lines wherever a more or less continuous flow of liquid is maintained and from which it is desired to abstract the impurities carried by the flowing liquid. Further objects of my invention embrace the removal, not only of the heavier solids, but also the heavier fluids that may be suspended in the moving stream of liquid. Further, to provide for the removal of substances of much the same weight as the liquid under treatment, and also to provide, where necessary, for the removal of gases, liquids and solids which are of less weight than the liquid under treatment. The invention also contemplates the recovery of any and all like substances from streams of liquid where the substances are of such value as to make it desirable to separate and conserve them.

As will presently appear, the invention is of a simple nature, and is embodied in an apparatus of comparatively small size and relatively little weight; and one that may be installed at almost any point in a pipe or line. Further, the invention is such that its use does not necessitate the expenditure of a materially increased head, or power, for the movement of the liquid through the apparatus. The apparatus performs a sequence of separating operations and is made up of respective parts that work together toward a finished result and which are so closely associated as to reduce the space and time of flow between the operations to a minimum and, importantly, to hold the frictional resistances within reasonable limits. This last is one of the reasons for the close assembly of the constituent parts which perform the sequential operations of filtering the liquid in the different ways prescribed hereby.

A further and distinct object which is reflected in the hereinafter described structure is the provision of a filtering apparatus of such a compact nature that it may be externally heated or cooled, without great cost, and thus adapted to use in certain novel methods of treating various liquids,—particularly in the chemical industries.

The invention will be readily understood on reference to the accompanying drawings, in which it is illustrated in its best present forms and proportions.

In the drawings, Fig. 1 is a sectional elevation of a line filter embodying this invention, so contrived as to also illustrate the operation of the novel process here claimed.

Fig. 2 is like unto Fig. 4 but illustrates the application of the filter head to larger sediment boxes or compartments like those of Fig. 1;

Fig. 3 is a partial section on the line 3—3 of Fig. 2;

Fig. 4 illustrates a complete filter, in which said head is provided with long down legs that receive the heavier substances from the filter head;

Fig. 5 is a vertical section of a separable filter head or traverse embodying this invention, the section being taken substantially on the line 5—5 of Fig. 6;

Fig. 6 is a horizontal section substantially on the line 6—6 of Fig. 5.

Figure 1:
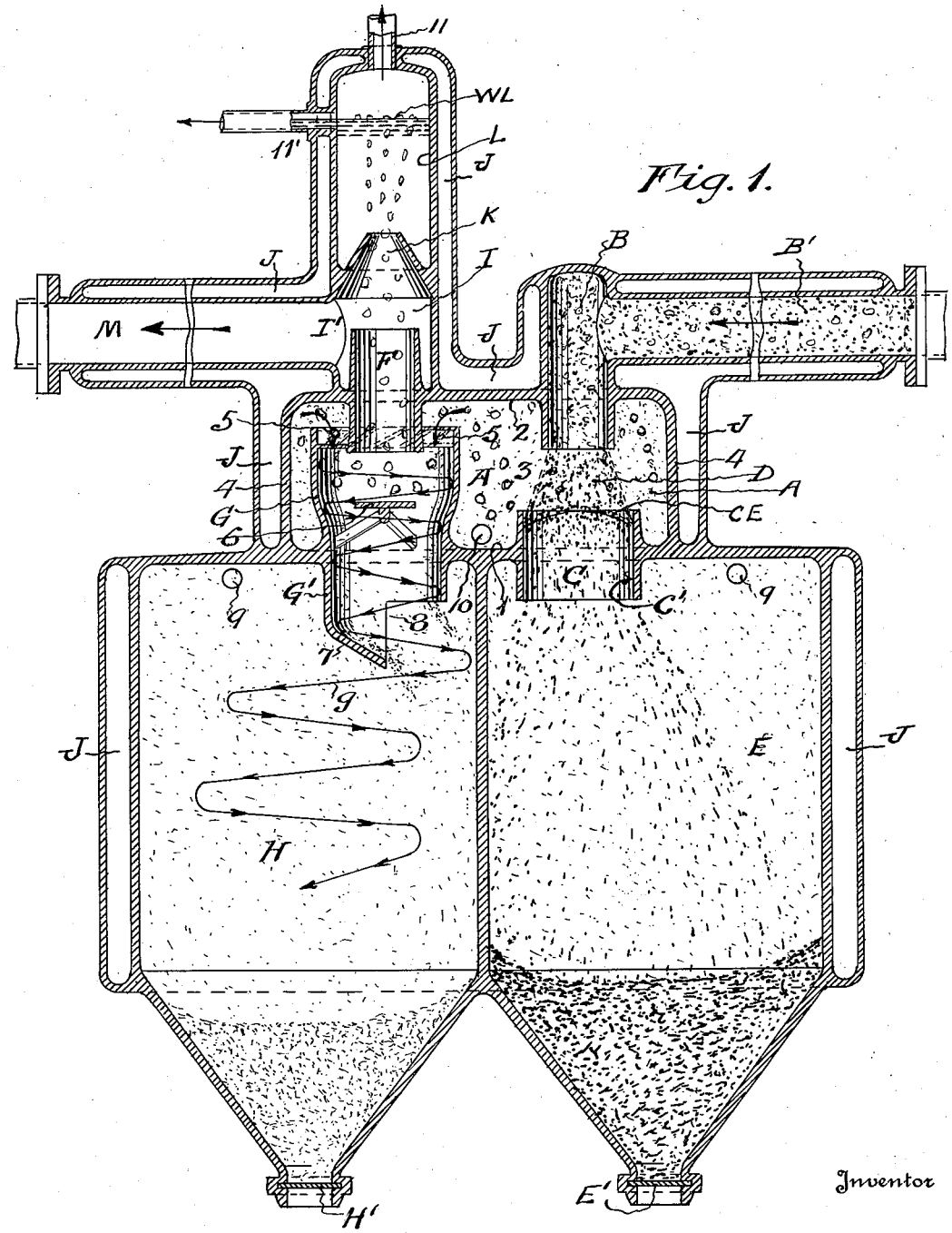

It is very common to accomplish the separation of substances by a change of direction. By this invention the separation is accomplished in the same direction as that in which the liquid flows. I apprehend that therein lies the secret of the small loss or drop of pressure between the intake and the outlet of my novel filter. It will shortly be observed that this accomplishment of separation in the direction of flow, and before there is any change in the direction of the flow of the main carrying stream of fluid takes place in each of the three main or sequential separating actions that characterize this filter. Thus, in the first stage of action the flowing stream of liquid is caused to impact the relatively non-resistant surface of a substantially quiescent body of the same liquid with the result that the heavier particles carried by the entering stream are lodged in and sink below said non-resistant surface.

Again, on leaving the region of the first separating action which I term downward impact separation, the fluid with its remaining burden of substances in suspension is caused to whirl within a confining element that constitutes part of the liquid course or channel, and there again, but in that case largely through the action of centrifugal force, an actual separation is accomplished in the direction of liquid flow. Thereafter, the whirling action referred to, plus the force of gravity, is relied upon to dispose of the separated substances, leaving the purified or clarified liquid to proceed on its course. Then follows the third stage or step of the process which I term an upward impact separation, and wherein the lighter substances that may be carried by the fluid, for example, oils, and gases are separated from the flowing stream in the direction of its flow. Such is the complete process of my invention and thereby liquids can be freed of substantially all foreign substances that are not in an actual state of solution.

In the last step of the operation as above outlined there is a difference to be observed over the first impact stage or step. The substances which are separated in the direction of flow are separated by the impulsion of the main stream in that direction, aided by gravity as represented by the difference in weight of the lighter substances and the carrying fluid.

Obviously, the process is purely mechanical in its nature. Its functions and effects as reviewed from a chemical standpoint are necessarily incidental to the mechanical operations. However, an exception is to be noted at this point. As depicted in Fig. 1, the apparatus is jacketed; to the end that it may be heated or cooled as may be found needful to so alter the chemical state of the substances carried by the fluid as to permit them to be separated in the manner above described or, reversely, to so alter them as to prevent the taking place of such separation.

By way of example of the first condition I will state that in carrying out this process for the purpose of clarifying pickling solutions and the like, I first chill the solution to the end that the sulphates shall be thrown down, that is, formed into filterable particles. A simple example of the second condition mentioned is found in plating solutions and the like where the substances that are required to render the solution effective must be kept warm or hot lest they precipitate. If the solution were permitted to cool below the critical point, such substances would become solids and would be removed by the aforesaid process along with the actual impurities.

I desire it understood that the heating and cooling jackets shown in Fig. 1 are purely exemplary, and that the invention is not limited to cooling and heating means that are directly associated with the filter itself. Further, as will appear in the appended claims, each step of the process is capable of separate use in cases that for one reason or another do not require the others.

It is believed that the foregoing brief statement of the invention will serve to properly supplement and clarify the following detailed description of the apparatus and its operation.

With a view to making it more clearly readable, Fig. 1 is intentionally made to depict the filter as though it were made or cast in a single piece. Indeed, it might well be so made. But, particularly in the larger sizes, and because it is desirable that the interior shall be accessible, it is generally made of several parts, usually as detailed in the other figures of the drawing.

The spaces or jackets marked J in Fig. 1 comprise a typical form of the temperature controlling means before mentioned; by which, when need be, the flowing contents of the filter may be kept at a predetermined temperature. The tempering means do not appear in Figs. 2 to 6; the apparatus in those forms being particularly designed for filtering liquids, such as water, and petroleum, at pipe or line temperatures.

In order that the speed of the operation may be understood, it may at once be explained that with this apparatus the best filtering results are secured with liquid velocities ranging as low as one foot per second up to eight feet per second. As in the case of pipe lines, the frictional losses become noticeable at higher velocities. For the filtering of fluids at unusual velocities, the filter head should be deeper and the space between the impact sections thereof greater than indicated by the drawings; as will shortly become apparent.

The member A, defined by the top (1), bottom (2), side (3), and end (4) walls, is called the traverse, the same being a cross-header, which joins a plurality of settling pockets.

The passage B, that extends downward into one end of the traverse is called the downward direction pipe.

The part C (a short cylindrical sleeve) extends downward through the floor of the traverse and is called the impact box. As shown it is spaced away (D) from the lower end of the direction pipe B.

The space D, just referred to, is called the expansion space; and, is of such height that, within the above defined range of velocities the conically expanding stream from the direction pipe B is intercepted by the inner periphery C' of the impact box; that box being substantially filled by the end of the expanded stream of liquid.

The part E is a settling pocket or chamber that receives the heaviest impurities.

The outlet of the traverse is formed by the vertical passage F, which is called the upward direction pipe.

The member G occupies the end of the traverse, is coaxial with the direction pipe F and with its adjuncts constitutes a centrifugal separator which serves to direct the liquid from the traverse into a rotative path that is coaxial with the pipe F. Briefly, as the result of such rotative direction, the heavy substances remaining in the liquid are centrifugally separated in the separator bowl or box G and are directed downward.

The part H is a settling chamber or pocket which receives such heavier substances from the part G, as indicated by the spiral line $g$.

The liquid finding another avenue of escape, moves towards the axis of the bowl G and rises in the pipe F, which forms the direct outlet of the bowl or separator G. The latter, obviously, is interposed between the body of the traverse A and the pipe or outlet F.

The part or chamber I, into which the pipe F opens, is called the sub-traverse; and, contains the outlet I' of the filter.

Above the pipe F and spaced therefrom is the upper impact box or cone K. The box K opens into the bottom of the separating chamber or dome L, which last receives the lighter substances, such as any gases and oils that may remain in the stream emerging from the direction pipe F.

It remains to define the member G in somewhat greater detail, thus it is to be noted that the generally cylindrical bowl proper G is larger than the pipe F and extends from the bottom of the traverse A to a point near the top thereof. The lower end of the pipe F extends downward into the top of the bowl; and the circular space between the two parts is occupied by a plurality of whirl promoting liquid directing tuyère blades 5, as well shown by the full and dotted angular lines, so marked, in Fig. 1. The blades 5, in the form depicted in Fig. 1, are downwardly and inwardly inclined and are separated from one another to form inwardly inclined tangential tuyères or openings for the downward entrance of the fluid. By such means the liquid within the bowl is caused to whirl about the axis of the same and the pipe F. And thus the heavier substances are centrifugally separated upon the inner surface of the bowl G, whence the continuing streams from the tuyère 5 propel them downwardly and into the pocket H. The part 6 is a vortex breaking disk that is fixed centrally in the bowl G considerably below the lower end of the pipe F. In that position it does not interfere with the downward movement of the separated heavier substances, but does effectively prevent the vortexial return of those substances once they have passed into the lower part of the bowl. As a further means to the same end, the bowl is extended into the pocket H (see part G') and is there provided with a preferably inclined partial bottom 7 and a side opening 8. The liquid within the bowl obviously is in continuous rotation and being in communication with the liquid in the pocket H through the eccentric opening 8, it communicates its movement to the larger body of liquid. The larger body rotates upon a vertical axis which does not coincide with the axis of the bowl G, and, due to the eccentric delivery of the collected substances at the opening 8 in the latter, they are delivered into a larger orbit of rotation and never return to that opening but instead move away therefrom and settle in the pocket H. When required a similar non-valved back-check device may be employed on the lower end of the impact box (see Fig. 2).

Special attention is called to the fact that the part G' of the bowl G and the part C'' of the box C extend below the tops of the respective pockets H and E and thus form them into the retaining traps which tend to prevent return flow and in particular positively retain in the tops of the pockets any floatable substances (of which there are many) that are forced downward into the pockets by the active liquid streams. Relief pipes or plugs 9 are provided at the tops of the pockets for the discharge of the lighter solids and gases that thus accumulate therein.

The part 10 represents a washout plug for draining or cleaning the filter head or traverse. There may be several of these in the walls thereof.

The bottoms of the pockets E and H have respective valves E' and H' through which the collected substances are discharged at intervals. Or the pockets may be drained continuously.

The dome L is preferably provided with a valved gas discharge outlet 11 and with a valved side drain 11' for the gases, oils and other floating substances. A single top outlet may serve for all except when the liquid level WL in the dome corresponds to the head under which the filter is operated or is maintained by the pressure of accumulated gas.

The liquid enters the filter through the line pipe B', which may join the side of the down pipe, as shown, or be in vertical alinement therewith. However, in most filtration plants it is desirable to conduct the operation under a minimum drop or head and hence it is usually better to include or cut the filter into the horizontal pipe line, as here shown.

As stated the stream issuing from the direction of pipe B, crosses the gap or space D and when entering the larger space expands so freely as to substantially fill the impact box C. That box and the pocket E being full of liquid without an outlet, the liquid therein is practically quiescent; and, the arching top of the pocketed liquid (indicated by the line C—E in Fig. 1), furnishes the non-resistant impact surface first above mentioned. The downward moving heavier substances contained by the liquid impact and penetrate this surface and thus start down into the pocket E, while the carrier liquid moves out into the body of the traverse A. Special attention is called to the provision of the capacious space A surrounding and extending below the top of the impact box C. The liquid is thereby freely relieved from the top of the box C and having a large space at hand moves slowly toward the next directing means to wit, the tuyères of the centrifugal separator G. The operation of that device having been fully explained, need not be repeated at this point. But it may be added that the centrifugal separator is not adapted to throw down substances, such as oils and gases, that are much lighter than the carrier liquid, hence such substances find their way upward in the direction pipe F and being propelled by the liquid moving upward therein, are projected across the sub-traverse I and into the relatively quiet body of liquid occupying the lower part of the dome or inverted pocket 12. The lighter substances rise to the surface WL and obviously cannot return against the heavier liquid in the lower part of the dome. Thus the operation of purifying the liquid is completed and the purified liquid, amply accommodated in the sub-traverse I re-enters the line pipe M at the filter outlet I'.

The apparatus has been described only as used in the clarification of liquids but it is to be understood that it is also well adapted for use in the separation and recovery of various substances from other fluids. This is also true as to each of the steps of the process, and each principal part of the apparatus.

The members N that appear at the top of Figs. 2 and 4 are filter heads. Those figures of the drawings serve to disclose the external appearance and Figs. 5 and 6 illustrate the internal construction thereof.

Fig. 2 shows how such a traverse or filter head is applied to the tops of sediment boxes O. Like the pockets E and H of Fig. 1, they differ in shape but operate in the same way. The parts marked P are back check traps in the pockets O. These operate on the principle explained in connection with the parts G', 7 and 8 of Fig. 1 and they respectively serve the impact box and the centrifugal separator in the filter head N.

The incoming and outgoing line pipe connections will be recognized in the companion flanges Q and R respectively.

The filter of Fig. 4 differs from the others in having long and capacious and therefore quiet zone down legs or pipes S, S. These replace the box-like pockets before described. Such legs not only are more convenient at times but in some cases also give better service.

It is believed that the several parts of the filter head, illustrated in Figs. 5 and 6, will at once be identified with the corresponding parts that are exhibited in Fig. 1. However, a few differences of construction require mention. First it will be noticed that the traverse N, and indeed all parts of the filter head, is of a thick walled construction. I have chosen to illustrate a filter head that is adapted for use under high pressure because now that this facility is available it will, I believe, become the general practice to filter liquids while flowing through pipes of moderate size and under high pressure as well as low pressure conditions. Such conditions are met with not only in the field of water distribution but in many others, including the mining and chemical industries and in hydraulic and also steam power production. In the latter it is clearly evident that both the boiler feed water and the water actually under pressure in the boiler should be continuously filtered to make and keep it as pure as possible. All such uses are contemplated by my invention and are made possible thereby.

Compared with Fig. 1, the filter head N, is distinguished by a shape which is best adapted to withstand pressure; by bottom flanges 15 that receive the settling pockets; by end openings 16 and detachable cover plates 17 therefor, and by the flange seats 18 and 19 on the top. The first receives the flanged T 20 which forms part of the downward direction pipe or passage $B^x$, the second receives the base flange 21 of the dome $L^x$; the latter contains the upgoing direction pipe $F^x$ and has the now familiar side outlet $I^x$, which is the outlet of the filter.

The impact box $C^x$ is formed by a removable sleeve 22, suitably held in the flanged bottom 15, and of course coaxial with the down passage $B^x$.

To accommodate variations of velocity in the flow of the liquid at different times, I prefer to employ means by which the length or width of the gap $D^x$ may be changed. For the higher velocities, the gap should be increased. For the lower velocity it may advantageously be diminished. For this purpose I provide a longitudinally adjustable sleeve or extension 23 which forms the lower end of the downgoing direction pipe. The sleeve telescopes therein and is raised, lowered and held by the rod 24, the upper end of which is broken away.

Turning now to the centrifugal element of the filter, the device shown in Figs. 5 and 6 is, I believe, superior to that shown in Fig. 1, but acts in the same way. It opposes less resistance to the flow of the liquid, is more efficient as a separator, is less bulky, and is readily accessible and separable. The last is a marked advantage in view of the fact that these filters must occasionally be inspected and cleaned, lest they become clogged with large objects that will not pass through the smaller openings of the filter.

As shown in Fig. 5, the bowl portion G× is a separate sleeve-like part that is inserted through the bottom of the traverse. It contains the now familiar vortex breaking disk 6× here supplemented by thin wide supporting blades 25 that tend to suppress the rotation of the liquid after it passes below the disk 6×. At the top of the sleeve G× is a shouldered seat 26, and on the under side of the traverse top there is a plain seat 27 surrounding the outlet 28. The latter is coaxial with the parts F× and G× and of the size of the part F×. Between the seats 26 and 27 is the tuyère 5×, by which the whirl of rotation is imparted to the liquid seeking to escape at the outlet 28. Its operation will be understood from the foregoing description of the corresponding part in Fig. 1, but its construction is novel and requires separate consideration.

The whirl promoting tuyère 5× comprises top and bottom rings and a plurality of tangentially positioned blades 29. By preference the ends of the tuyère blades are bent at right angles to the bodies thereof and are permanently riveted to respective rings, as shown at points 30, Figs. 5 and 6. The bottom ring is made in two parts or segments 31 and 31'. Likewise the upper ring is made in two segments 32 and 32'. The larger segment of the lower ring is secured to the top of the bowl member G× as by a plurality of bolts 33. The parting lines 34 between the segments most clearly appear in Fig. 6. The shorter section is separable but is normally held in place by the clamp 35 and bolt 36. Obviously, as the blades are fastened to respective sections of the two rings there is a shorter segment of the tuyère as a whole which is removable from between the seats 27 and 26. When removed this may be placed as shown by the dotted lines at the left hand of Figs. 5 and 6. It can of course be removed only after the opposed cover plate 17 has been removed.

It should be especially noted that the internal diameter of the tuyère as marked by the inner edges of the overlapping tangential blades, is of considerably greater diameter than the opening 28. Thereby the inner portion of the top ring is made use of as an annular abutment 37, which is interposed between the tops of the blades and the central outlet 28.

The fluid from the body of the traverse enters through the many tangential tuyères formed by the blades 29 and therefore takes on a whirling movement within the tuyère 5× and bowl G×. Thereby the heavier substances are centrifugally separated and being opposed by the annular abutment 37 at the top are forced downwardly into the bowl leaving only the clear liquid to rise into the outlet 28, the direction pipe F× and the dome L×.

The parts 38 are washout plugs which are conveniently positioned in the cover plates 17 and facilitate the washing out of the interior of the filter at times when the flow therethrough is interrupted. At such times the cover plates if removed permit access to all parts and by removing the separable sections of the tuyère 5× it is made easy to inspect and clean the same internally as well as externally.

Various modifications of my invention will readily suggest themselves to one who is skilled in the art and it is to be understood that the invention is by no means limited to the structures herein specifically shown and described and that instead the scope and the particulars of the invention are to be ascertained from the appended claims as read in the light of the foregoing.

Having thus described my invention I claim as new and desire to secure by Letters Patent:—

1. The herein described process of filtering fluids without resort to screens that consists in establishing three substantially quiet and vertically extended bodies of the fluid under treatment, cross-connecting the upper end of the first and second of said bodies and cross-connecting the upper end of the second with the lower end of the third body, admitting the fluid longitudinally against the upper end of the first body and thereby depositing its heavier substances therein, subjecting the partly purified fluid to longitudinally downward rotative motion between the second and third bodies and thereby depositing the remaining heavy substances in said second body, directing the twice purified fluid longitudinally against the lower end of the third of said bodies, and thus delivering the lighter substances to the surface of said third body, and, finally directing the movement of the purified fluid from the lower part of said third body.

2. That part of the process described in claim 1 that consists in separately confining two substantially quiet and vertically extended bodies of the fluid under treatment, horizontally cross-connecting the upper end of the first and the lower end of the second of said bodies, admitting the fluid longitudinally against the upper end of the first confined body and thereby depositing its heavier substances therein, then directing the thus purified fluid longitudinally upward against the lower end of the second confined body of fluid and thus delivering the lighter substances to the top surface thereof, and, finally directing the movement of the purified fluid from the lower part of said second confined body.

3. That part of the process described in claim 1 that consists in separately confining two substantially quiet and vertically extended bodies of the fluid under treatment, horizontally cross-connecting the upper end of the first with the lower end of the second of said confined bodies, whirling the fluid longitudinally downward against the upper end of the first of said bodies, and thereby depositing the heavier substances therein, then discharging the partly purified fluid longitudinally upward against the lower end of said second confined body of fluid, and thus delivering the lighter substances to the top surface thereof, and, finally directing the movement of the purified fluid from the lower part of said second confined body.

4. That part of the process described in claim 1 that consists in confining a vertically extended substantially quiet body of the fluid under treatment, admitting the fluid longitudinally downward against the upper end of said body, circumferentially restricting said upper end of said body and causing the concurrence of such restricted end with the lower circumferential margin of the downward moving stream, thereby depositing the heavier substances in said body, and finally permitting the purified fluid to move laterally from the region or surface of first impact between said stream and body.

5. That part of the herein described filter or separator distinguished by a cross-header or traverse, in combination with a downward direction pipe opening downward into the top of said traverse, and, a closed settling pocket having a constricted top that opens upward into the bottom of said traverse and forms an impact box that is substantially coaxial with said pipe but separated therefrom by an expansion gap intermediately within said traverse.

6. That part of the herein described filter or separator that comprises a cross-header or traverse, in combination with a dome erected on said traverse and rising therefrom, and a vertical upward direction pipe opening into the bottom of said traverse and substantially coaxial with said dome.

7. That part of the herein described filter or separator for removing lighter substances from carrier fluids, that consists in a cross-header or traverse, in combination with a vertical upward direction pipe penetrating the top of said traverse and forming an outlet at the end of said traverse, a dome rising above said pipe and outlet, and an impact box in said dome above said outlet.

8. That part of the herein described filter or separator having a horizontally extended cross-header or traverse, in combination with a downward direction pipe penetrating the top of said traverse, a settling pocket having a top that penetrates the bottom of said traverse and forms an impact box that is substantially coaxial with said pipe but separated therefrom by an expansion gap, and means of changing the effective height of said gap.

9. That part of the herein described filter or separator, comprising a traverse, in combination with a cross-header or separating bowl rising through and above the bottom of said traverse, whirl producing means in said traverse at the top of said bowl and adapted to direct into said bowl the heavier substances carried by the fluid entering from said traverse, a settling pocket below said traverse and communicating with said bowl, and a central outlet rising from said whirl producing means.

10. That part of the herein described filter or separator, comprising a cross-header or traverse, in combination with a bowl rising through the bottom of said traverse, whirl producing means at the top of said bowl in said traverse and adapted to direct the heavier substances into said bowl, a settling pocket below said traverse and communicating with said bowl, a central outlet rising from said whirl producing means, and a vortex breaking disk positioned centrally in said bowl beneath said means and outlet.

11. That part of the herein described filter or separator, comprising a cross-header or traverse, in combination with a bowl portion rising through the bottom of said traverse, whirl producing means at the top of said bowl and adapted to direct the heavier substances downward therein, a central outlet rising from said means, a settling pocket below said traverse and a back check trap therein and at the bottom of said bowl and in eccentric communication therewith.

12. That part of the herein described filter or separator, comprising a bowl portion, in combination with whirl producing means at the top of said bowl and adapted to direct the heavier substances thereinto, a chamber to receive the same from the bowl, a central outlet extending from said whirl producing means at the end opposite said bowl, and a vortex breaking disk positioned centrally in said bowl opposite said outlet.

13. That part of the herein described filter or separator, comprising a bowl portion, in combination with whirl producing means through which the fluid is introduced into said bowl, a purified fluid outlet rising centrally from said means, a settling pocket positioned beneath said bowl, and a back check trap extending from said bowl into said pocket and there provided with an eccentrically positioned discharge opening.

14. That part of the herein described filter or separator, comprising a bowl portion, in combination with whirl producing means through which the fluid is introduced into said bowl, an outlet for purified fluid rising centrally from said means, a settling pocket positioned beneath said bowl and axially eccentric thereto, and a back check trap extending from said bowl into said pocket and there provided with a discharge opening that is eccentric to both said bowl and pocket.

15. That part of the herein described filter or separator, comprising a bowl portion, in combination with a ring-like, tangentially bladed, whirl producing tuyère thereon, an outlet leading centrally from said tuyère, and a vortex defeating disk positioned between said outlet and the bottom of said bowl portion and of approximately the same diameter as said outlet.

16. That part of the herein described filter or separator, comprising a bowl portion, in combination with a ring like, tangentially bladed, whirl producing tuyère thereon, an outlet leading centrally from said tuyère, a vortex breaking disk positioned between said outlet and the bottom of said bowl portion, a cross-header or traverse surrounding said tuyère, and having a covered opening laterally opposite the same and said tuyère having a segment containing several of its blades and separable from the remainder of the tuyère and removable through said opening.

17. That part of the herein described filter or separator, comprising a cross-header or traverse, in combination with, a downward direction pipe penetrating the top of said traverse, a larger cylindrical impact box penetrating the bottom of said traverse, the ends of said pipe and box being spaced apart vertically within said traverse, and means for varying the effective length of the space between the same.

18. That part of the herein described filter or separator comprising two settling pockets, in combination with a cross-header or traverse upon the tops thereof, means for directing the fluid to be treated downward into the top of the first said pocket, an outlet in the top of said traverse above the second pocket, and a centrifugal unit forming the avenue of communication between said traverse and both said second pocket and said outlet.

19. The herein described filter or separator comprising two settling pockets, in combination with a cross-header or traverse upon the tops thereof, means for directing the fluid to be treated downward into the top of the first said pocket, an outlet in the top of said traverse above the second pocket, a centrifugal unit forming the avenue of communication between said traverse and both said second pocket and said outlet, an inverted settling pocket above said outlet and at its bottom containing the final discharge opening, and, means for directing the fluid from said outlet past said opening and toward the top of the said dome.

20. That part of the herein described filter or separator comprising two substantially parallel vertical settling pockets one above the other, in combination with a cross-header or traverse connecting their adjacent ends, means for directing the fluid to be treated downwardly across said traverse in axial alinement with the upper end of the first pocket, means for directing the fluid from the traverse upwardly into the lower end of the second pocket, and said second pocket having outlet for purified fluid at its lower end.

21. That part of the herein described filter or separator comprising a cross-header or traverse, in combination with means for directing the fluid downwardly across the traverse, an impact box rising within the bottom of said traverse, a settling pocket below said box, and a back check passage having an eccentric discharge opening, between said box and pocket.

22. That part of the herein described filter or separator comprising a cross-header or traverse, in combination with means for directing the fluid downwardly across the traverse, an impact box rising within the bottom of said traverse part way toward said means, a closed settling pocket below into which said box opens, and backflow preventing means at the lower end of said box.

In testimony whereof I have hereunto set my hand this 6th day of March, A. D. 1926.

CHARLES GILBERT HAWLEY.